United States Patent [19]

Krofchak et al.

[11] Patent Number: 5,893,463

[45] Date of Patent: Apr. 13, 1999

[54] RECOVERING PRECIOUS METALS AND SMALL PRECIOUS STONES FROM CLAY SUSPENSIONS

[75] Inventors: David Krofchak, Copper Cliff; Peter A.C.A. Howe, Scarborough; David M. Howe, Sudbury, all of Canada

[73] Assignee: Ateba Mines Inc., Scarborough, Canada

[21] Appl. No.: 08/838,208

[22] Filed: Apr. 16, 1997

[51] Int. Cl.⁶ .......................................................... B03B 1/00
[52] U.S. Cl. .................................................. 209/5; 209/902
[58] Field of Search ................................. 209/5, 4, 166, 209/902; 210/697; 252/303, 324, 325

[56] References Cited

U.S. PATENT DOCUMENTS

| | | | |
|---|---|---|---|
| 2,374,100 | 4/1945 | Jackson | 210/697 X |
| 4,597,791 | 7/1986 | Siddall | 209/5 X |
| 4,976,781 | 12/1990 | Mainwaring et al. | 209/5 X |

*Primary Examiner*—David H. Bollinger
*Attorney, Agent, or Firm*—Rogers & Scott

[57] ABSTRACT

A process for recovering precious metal particles or small precious stones from aqueous clay suspensions containing said precious metal particles or precious stones in suspension with clay particles includes adding a sufficient amount of deflocculating agent to cause deflocculation of the clay particles, and allowing the deflocculated suspension to settle. The settled material containing the precious metal particles or small precious stones is then removed.

12 Claims, No Drawings

RECOVERING PRECIOUS METALS AND SMALL PRECIOUS STONES FROM CLAY SUSPENSIONS

This invention relates to the recovery of precious metal particles and small precious stones from aqueous clay suspensions containing such particles in suspension with clay particles. The precious metal particles may for example be gold particles, and the small precious stones may for example be diamonds, sapphires or rubies.

BACKGROUND OF THE INVENTION

Many ore bodies containing precious metals and precious stones are found in complex deposits, such as sedimentary, alluvial, oxidized volcanic bodies and laterites, which also contain clay. Such ore bodies are usually mixed with water, the coarse material screened out, and the resultant concentrate treated in a further process where precious metals and/or precious stones are recovered. Although this procedure works fairly well, it has been found that the clay content often forms balls which plug the screens and generally interfere with the recovery process. It is known that the clay balls encapsulate appreciable quantities of precious metal particles and precious stones which are lost in reject tailings. Precious metal particles and small precious stones are thus then present in suspension with clay particles in tailings ponds.

So far as is known, the problem of preventing the formation of clay balls and recovering such suspended precious metal and/or precious stones has not yet been solved in a cost effective manner. Attempts have been made to solve the problem by massive dilution with water or separate processing of the clay balls. However, both of these procedures are expensive and time consuming.

It is therefore an object of the invention to provide a cost effective process for recovering precious metal particles and small precious stones from aqueous clay suspensions containing such particles in suspension with the clay particles.

The present invention is based on the discovery that precious metal particles and/or precious stones can be separated from the clay particles in the suspension by means of a deflocculating agent.

According to the invention, a sufficient amount of deflocculating agent is added to cause deflocculation of the clay particles, allowing the deflocculated suspension to settle, and the settled material containing the precious metal particles and/or small precious stones is recovered.

The aqueous clay suspension may contain from about 1 to about 40% clay by weight, and the deflocculation agent may comprise sodium tripolyphosphate. The weight of sodium tripolyphosphate added may be from about 0.03 to about 1% of the dry weight of clay in the suspension.

The gold particles may have a size in the range of from about 0.1 to about 5 millimeters. The precious stones may comprise diamonds, sapphires or rubies. The diamonds may have a size in the range of from about 0.5 to about 10 millimeters, the sapphires may have a size in the range of from about 5 to about 30 millimeters, and the rubies may have a size in the range of from about 5 to about 30 millimeters.

DESCRIPTION OF PREFERRED EMBODIMENTS

The manner in which the deflocculating agent can be added to the clay suspension will be readily apparent to a person skilled in the art, and specific examples of the invention will now be described.

EXAMPLE 1

A sedimentary material from Rancheria, California, U.S.A. contained gold and various silicate compounds and clays, some of which had undergone a metamorphism. After this material had been mined, crushed and wet screened, the recovery of gold in a conventional manner was between 45 and 80%. Oversize (reject) material was collected from the trommel whose aperture size was 0.25 inches. 78 lbs. of this reject material, consisting of 63 lbs. of clay balls and 15 lbs. of cemented gravel of fine gold-bearing placer material was placed in a small concrete mixer. A 5% aqueous solution of sodium tripolyphosphate was added in accordance with the invention in an amount such that the weight of sodium tripolyphosphate was 0.4% of the dry weight of the contained clays. The mixture was agitated in the concrete mixer for two hours at a very slow rotation speed. After such agitation, the liquid was decanted off, and the remaining solid material (settled sediment) was dried and weighed.

The dry weight of the sediment was 38 lbs., indicating that 40 lbs. of water and light sediment material had been removed from the original 78 lb. sample. All of the clay balls and about 90% of the cemented gravel had disintegrated. The sediment was then processed in a conventional manner for gold recovery, and about 150 specks of fine gold with a size of about 0.1 to 0.5 mm were observed on the wilfley table. The gold specks were recovered and were found to be 92% of the gold in the reject material.

EXAMPLE 2

At the same site as in Example 1, five 50 gallon drums of clay ball material were collected from the trommel. A 5% aqueous solution of sodium tripolyphosphate was added in an amount such that the weight of sodium tripolyphosphate was 0.4% of the dry weight of the clay. The drums were covered, and their contents allowed to stand for one week.

The drum contents were then processed for gold recovery using standard mechanical techniques, but using the sodium tripolyphosphate solution as a medium. The clay balls had disintegrated and specks of gold with a size of about 0.1 mm were observed on the wilfley table. The gold was recovered and found to represent 80% of the gold in the clay ball material collected from the trommel.

EXAMPLE 3

Ore processed in a Costa Rica gold mine contained up to 30% clay by weight. The ore was pulped in water and then processed through cyanidation vats. Considerable problems were encountered with clay causing gold particles with a size of about 0.1 mm to be held in suspension with the clay. This problem could have been overcome by substantially diluting the clay with water, but such a procedure would hydraulically overload the plant and reduce its throughput. Sodium tripolyphosphate with a weight of 0.5% of the dry weight of the clay was added in a 5% aqueous solution in accordance with the invention, and it was found that the clay subsequently ran at the viscosity of water, allowing the gold particles to settle out and the liquified clay to separate.

EXAMPLE 4

Three similar laboratory tests were carried out using three types of precious stones, namely diamonds, sapphires and rubies.

In the first test, 160 grams of clay from a Costa Rica mine were placed in a beaker, the viscosity of the clay being about 40 centipoises. Ten diamonds, each about 1 mm in diameter, were added and the contents stirred to produce a clay suspension. The contents were then poured into another beaker. Remaining contents in the first beaker were diluted with water and examined. No diamonds had remained behind, i.e. all the diamonds had become entrained in the clay suspension. 5 ml of a 10% aqueous solution of sodium tripolyphospate was then added to the contents of the second beaker, the weight of sodium tripolyphosphate being 0.1% of the dry weight of the clay in accordance with the invention. The mixture was agitated and then left standing for 30 seconds. The clay had become very liquid with a viscosity of about 5 centipoises and was decanted off, leaving the solid material in the bottom of the beaker. All ten diamonds were recovered in the settled out material.

The test was repeated with ten sapphires of about 2 mm diameter, and these were easily removed in the same way as the diamonds. The test was again repeated with ten rubies of about 2 mm diameter, again with similar results.

Other examples and embodiments of the invention will be readily apparent to a person skilled in the art, the scope of the invention being defined in the appended claims.

We claim:

1. A process for recovering precious metal particles or small precious stones from an aqueous clay suspension containing said precious metal particles or precious stones in suspension with clay particles including:

adding a sufficient amount of deflocculating agent to said aqueous clay suspension to cause deflocculation of the clay particles and produce a deflocculated suspension containing the precious metal particles or precious stones, allowing the deflocculated suspension to settle, and removing settled material containing the precious metal particles or small precious stones.

2. A process according to claim 1 wherein the aqueous clay suspension contains from about 1 to about 40% clay by weight.

3. A process according to claim 2 wherein the deflocculating agent comprises sodium tripolyphosphate.

4. A process according to claim 3 wherein the weight of sodium tripolyphosphate added is from about 0.03 to about 1% of the dry weight of clay in the suspension.

5. A process according to claim 1 wherein the precious metal particles comprise gold particles.

6. A process according to claim 5 wherein the gold particles are of a size in the range of from about 0.1 to about 5 millimetres.

7. A process according to claim 1 wherein the precious stones comprise diamonds.

8. A process according to claim 7 wherein the diamonds have a diameter in the range of from about 0.5 to about 10 millimetres.

9. A process according to claim 1 wherein the precious stones comprise sapphires.

10. A process according to claim 9 wherein the sapphires have a diameter in the range from about 5 to about 30 millimetres.

11. A process according to claim 1 wherein the precious stones comprise rubies.

12. A process according to claim 11 wherein the rubies have a diameter in the range of from about 5 to about 30 millimetres.

* * * * *